United States Patent
Rao et al.

(10) Patent No.: US 6,757,611 B1
(45) Date of Patent: Jun. 29, 2004

(54) ADAPTIVE SAFETY SYSTEM FOR A BUMPER-BAG EQUIPPED VEHICLE

(75) Inventors: Manoharprasad K. Rao, Novi, MI (US); Kwaku O. Prakah-Asante, Commerce Township, MI (US); Gary Steven Strumolo, Beverly Hills, MI (US); Saeed David Barbat, Farmington Hills, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/249,999

(22) Filed: May 27, 2003

Related U.S. Application Data

(60) Provisional application No. 60/432,973, filed on Dec. 13, 2002.

(51) Int. Cl.[7] .............................................. G06F 17/10
(52) U.S. Cl. ...................... 701/301; 701/45; 180/271; 180/274; 280/734; 340/435; 340/436; 340/903
(58) Field of Search ............................ 701/45, 46, 301; 180/268, 271, 274; 280/735, 734; 340/435, 436, 438, 439, 903

(56) References Cited

U.S. PATENT DOCUMENTS 5,959,552 A    9/1999  Cho
6,142,524 A    11/2000 Brown
6,271,747 B1   8/2001  Fendt
6,519,519 B1 * 2/2003  Stopczynski .................. 701/45
6,607,255 B2 * 8/2003  Bond et al. .................. 303/193

OTHER PUBLICATIONS

Patent Publication No. (US 20030149530) Stopczynski discloses a collision warning and safety countermeasure system filed Feb. 1, 2002.*

* cited by examiner

*Primary Examiner*—Gertrude A-Jeanglaude
(74) *Attorney, Agent, or Firm*—Frank A. MacKenzie

(57) ABSTRACT

The present invention provides a safety system control method for a host automotive vehicle. The method includes providing a first vehicle safety countermeasure and providing a second vehicle safety countermeasure operable in a first mode corresponding to the first vehicle safety countermeasure being inactive and a second mode corresponding to the first vehicle safety countermeasure being activated. The method also determines a collision threat with a target object and selectively activates the first vehicle safety countermeasure as a function of the collision threat. The second vehicle safety countermeasure is then activated in the second mode when the first vehicle safety countermeasure is activated. Otherwise, the second vehicle safety countermeasure is activated in the first mode when the first vehicle safety countermeasure is inactive.

20 Claims, 6 Drawing Sheets

ADAPTIVE SAFETY SYSTEM FOR A BUMPER-BAG EQUIPPED VEHICLE

BACKGROUND OF INVENTION

The present invention relates to automotive safety systems and, more particularly, concerns an adaptive occupant protective system for vehicles equipped with bumper-bag systems.

Current vehicle crash safety systems typically employ accelerometers that measure decelerations acting on the vehicle body during a crash event. In response to signals from such accelerometers, airbags or other safety devices are activated. In certain crash situations, however, it is desirable to provide information before forces actually act upon the vehicle such as when a collision is unavoidable. Such systems are commonly known as collision prediction systems or pre-crash warning systems. Such remote sensing applications use radar, lidar, or vision-based technologies for collision avoidance and pre-collision warning applications.

With regard to occupant safety systems, in addition to conventional airbags within the passenger compartment, exterior airbag systems are also being considered for vehicle applications. These exterior airbag applications are commonly referred to as "bumper-bag" applications, when the bags are located along the exterior of the vehicle near the front or rear bumpers.

Bumper-bag systems are most effective when they are fully deployed before actual physical contact with the impacting object. Accordingly, unlike interior occupant airbags, bumper-bags are most likely to be deployed in response to pre-crash sensing information.

When bumper-bags are deployed in a crash situation, however, they can change the collision dynamics of the vehicle which would otherwise occur by acting as an additional energy-absorbing component and by providing additional collapsible distance. These changes in the collision dynamics can affect the host vehicle crash pulse as seen by the accelerometers, the crash duration, the amount of passenger compartment deformation, and other occupant injury-producing phenomena.

Bumper-bag systems, however, are not deployed in all crash situations. For example, to minimize repair costs, bumper-bags may not be deployed in relatively low-velocity impact situations. Also, due to real-time performance limitations of the pre-crash sensing systems, bumper-bags may not be deployed in crash situations with very high relative velocities between the impacting and host vehicle, or when the pre-crash sensing system cannot "see" the impacting object such as, for example, during a high speed intersection-type collision.

Accordingly, it is desirable to optimize the performance of the occupant safety systems, and the vehicle interior occupant airbags in particular, under both situations when the bumper-bags are deployed and are likely to alter the collision dynamics, and when the bumper-bags have not been deployed and the crash situation is equivalent to a vehicle without a bumper-bag system. The present invention is directed towards providing such an adaptive safety system for bumper-bag equipped vehicles.

SUMMARY OF INVENTION

An adaptive safety system for bumper-bag equipped vehicles in accordance with one embodiment of the present invention includes a safety system control method for a host automotive vehicle. The method comprises providing a first vehicle safety countermeasure and providing a second vehicle safety countermeasure operable in a first mode corresponding to the first vehicle safety countermeasure being inactive and a second mode corresponding to the first vehicle safety countermeasure being activated. The method also determines a collision threat with a target object and selectively activates the first vehicle safety countermeasure as a function of the collision threat. The second vehicle safety countermeasure is then activated in the second mode when the first vehicle safety countermeasure is activated. Otherwise, the second vehicle safety countermeasure is activated in the first mode when the first vehicle safety countermeasure is inactive. The first vehicle safety countermeasure can be an external vehicle airbag and the second vehicle safety countermeasure can be in internal occupant airbag.

In another embodiment, a safety system control method for a host automotive vehicle including at least one external vehicle airbag and at least one internal occupant airbag is provided. The method includes determining a collision threat with a target object, selectively activating the external vehicle airbag as a function of the collision threat, and, in response to a crash event, activating at least one internal occupant airbag in a first mode when the external vehicle airbag is activated, otherwise, activating the at least one internal occupant airbag in a second mode when the external vehicle airbag is inactive.

In anther embodiment, a safety system for an automotive vehicle having a pre-crash sensing system is provided. The system includes a first vehicle safety countermeasure, a second vehicle safety countermeasure operable in a first mode corresponding to the first vehicle safety countermeasure being inactive and a second mode corresponding to the first vehicle safety countermeasure being activated, and a controller coupled to the pre-crash sensing system and the first and second vehicle safety countermeasures. The controller determines a collision threat with a target object, selectively activates the first vehicle safety countermeasure as a function of the collision threat, and activates the second vehicle safety countermeasure in the second mode when the first vehicle safety countermeasure is activated.

The present invention is advantageous in that it can provide improved occupant protection by optimizing the response characteristics of the occupant safety systems in response to likely changes in vehicle collision dynamics resulting from bumper-bag or other countermeasure deployment.

Other advantages and features of the invention will become apparent to one of skill in the art upon reading the following detailed description with reference to the drawings illustrating features of the invention by way of example.

BRIEF DESCRIPTION OF DRAWINGS

For a more complete understanding of this invention, reference should now be made to the embodiments illustrated in greater detail in the accompanying drawings and described below by way of examples of the invention.

In the drawings.

DETAILED DESCRIPTION

While the present invention is described with respect to an adaptive safety system for bumper-bag equipped vehicles, the present invention may be adapted and utilized for other vehicle safety systems wherein the vehicle crash dynamics may be altered as a result of deployment of various safety devices such that it is desirable to modify the behavior of the safety systems acting upon the vehicle occupant.

Also, in the following description, various operating parameters and components are described for one constructed embodiment. For example, the adaptive safety system of the present invention is described as being implemented in a vehicle with a bumper-bag system and including a pre-crash sensing system having vision and radar-based sensing capabilities. These specific parameters and components are included as examples and are not meant to be limiting. In particular, the adaptive safety system is intended to be readily adaptable to any bumper-bag equipped vehicle without regard to the particular pre-crash sensing system employed.

Figure 1:
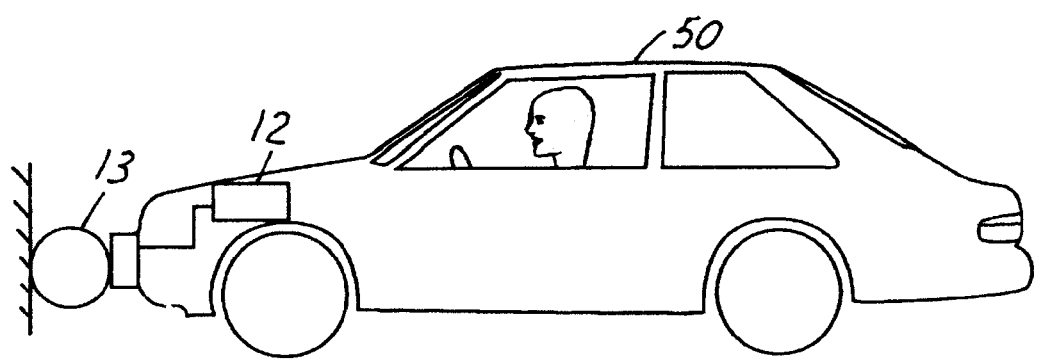
FIG. 1 is a schematic side view of a bumper-bag equipped vehicle according to an embodiment of the present invention with the bumper-bag deployed.

Referring now to the drawings wherein like reference numerals are used to identify identical components in the various views, FIG. 1 illustrates a schematic side view of a bumper-bag equipped vehicle 50 according to an embodiment of the present invention with the bumper-bag 13 fully deployed. The adaptive safety system of the present invention includes a controller 12 which will be described in more detail below. In the example of FIG. 1, the front bumper-bag 13 is shown fully deployed. The vehicle 50 may also include a rear bumper-bag and side external airbags, as well. As can be seen in FIG. 1, when the bumper-bag is deployed, it provides additional, collapsible frontal distance for the vehicle 50 with respect to the impacting object. When the bumper-bag 13 is effectively fully deployed just before physical contact with an impacting object, it will change the collision dynamics of the vehicle 50 by acting as an additional energy absorbing component as well as providing the additional collapsible frontal distance. To be fully effective, however, it is desirable that the bumper-bag 13 be fully deployed before physical contact with the detected impacting object. Accordingly, vehicles with bumper-bags typically include a pre-crash sensing system to detect objects before they actually physically contact the vehicle 50.

Figure 2:
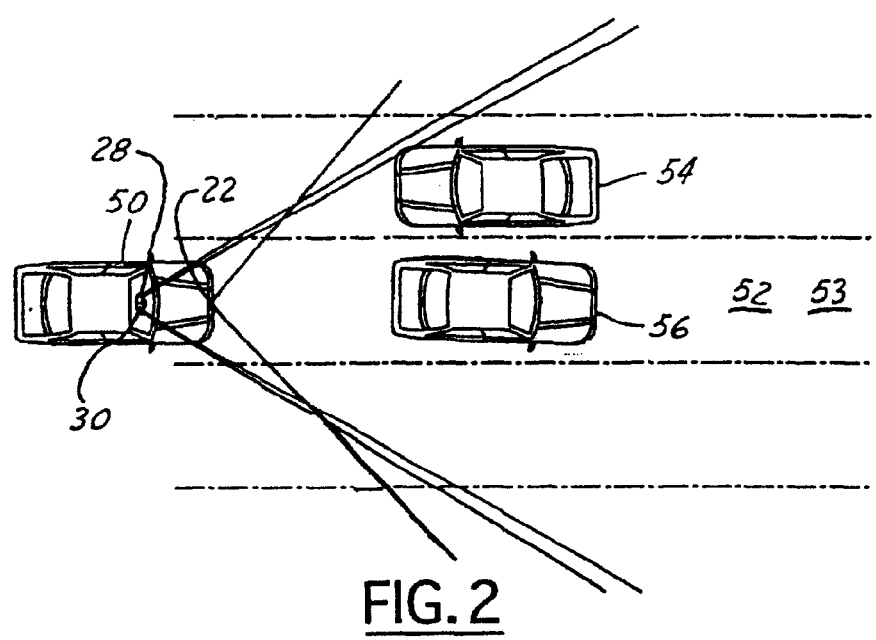
FIG. 2 is a top view of a bumper-bag equipped vehicle with a multi-sensor pre-crash sensing system according to an embodiment of the present invention.

Referring now to FIG. 2 there is shown a top view of the bumper-bag equipped vehicle 50 with a multi-sensor pre-crash sensing system. The vehicle 50 of FIG. 2 includes a vision system with a stereo pair of cameras 28, 30 and a radar system 22 with a wide field-of-view detection zone. Together the vision and radar systems provide one example of a multi-sensor pre-crash sensing system for a bumper-bag equipped vehicle in which the present invention may be used to advantage. The radar system can detect the presence of an object in its detection zone 52, and obtain distance and relative velocity information to the detected object with reference to the host vehicle. The camera system alone can also be used to detect the presence of the object in its detection zone 53, and obtain distance, relative velocity and size information for the detected object with respect to the host vehicle 50. Alternately, the radar system can be used to detect the presence of the object and provide distance and relative velocity information, and the vision system can be used to confirm the distance and relative velocity information and also provide additional information regarding the size of the detected object. For pre-crash sensing applications, it is advantageous to have both radar and vision-based systems to ensure good performance under all weather conditions and also to provide redundancy for improved reliability.

The host vehicle 50 is illustrated with respect to target vehicles 54 and 56. Target vehicle 54 is traveling in an opposite direction to the host vehicle 50. Target vehicle 56 is traveling in the opposite direction of vehicle 54. The pre-crash sensing systems have object detection and threat assessment algorithms, which are well known to people skilled in the art of collision threat assessment that can differentiate between objects such as 54, which are harmlessly passing by, and objects such as 56, which may cause collision with the host vehicle.

Figure 3:
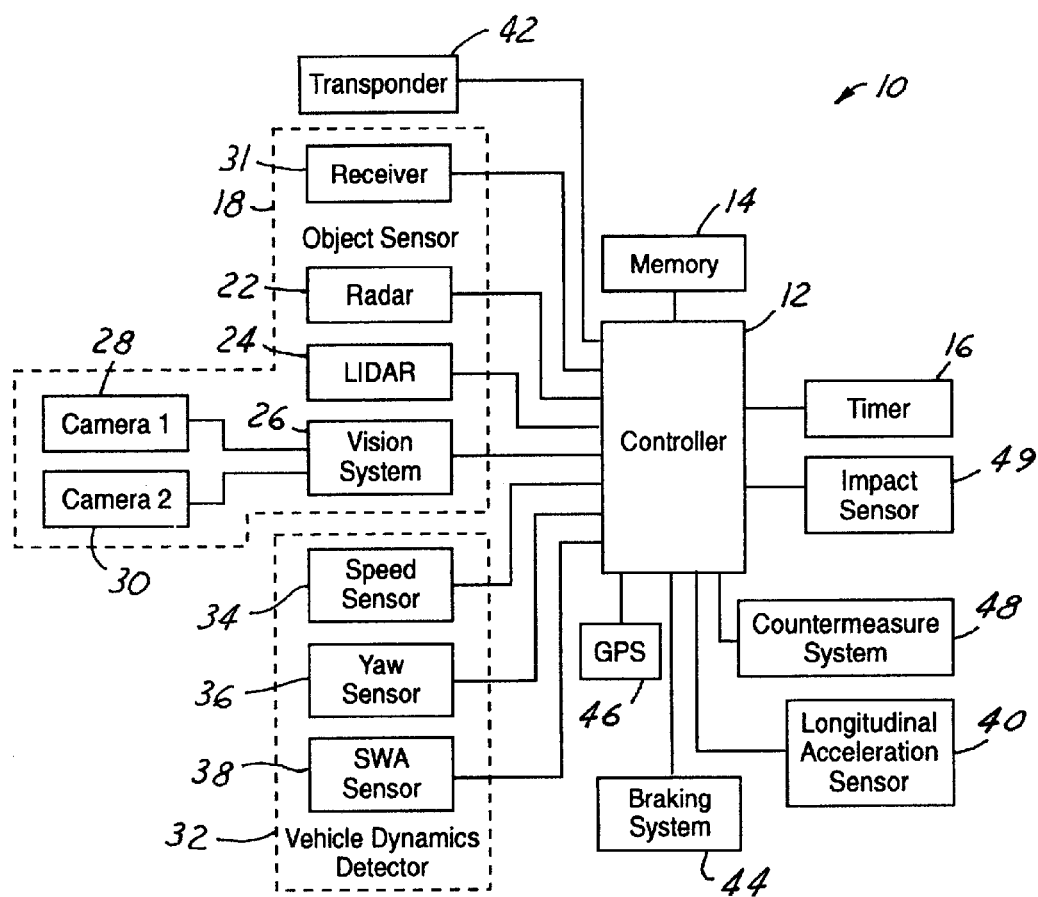
FIG. 3 is a block diagrammatic view of one example of a pre-crash sensing system for a bumper-bag equipped vehicle in which the present invention may be used to advantage.

FIG. 3 is a block diagrammatic view of one example of a pre-crash sensing system for a bumper-bag equipped vehicle which includes an adaptive safety system according to the present invention. The pre-crash sensing system 10 has a controller 12. The controller 12 is a preferably a microprocessor-based controller that is coupled to a memory 14 and a timer 16. Memory 14 and timer 16 are illustrated as separate components from that of the controller 12, however, those skilled in the art will recognize that memory 14 and timer 16 may be incorporated into controller 12. Controller 12 may be one component or a collection of individual control elements. Further, several features of controller 12 can be implemented in software, however, those skilled in the art will also recognize that such systems may be implemented in hardware.

Memory 14 may comprise various types of memory including read-only memory, random access memory, electrically erasable programmable read-only memory, and keep-alive memory. Memory 14 is used to store various thresholds and parameters as will be further described below.

Timer 16 is a timer such as a clock timer of a central processing unit within controller 12. Timer 16 is capable of timing the duration of various events as well as counting up or counting down. For example, based on time, the acceleration of the vehicle can be determined from a velocity.

A remote object sensor 18 is coupled to controller 12. Remote object sensor 18 generates an object signal in the presence of an object within its field-of-view (FIG. 2). Remote object sensor 18 may be comprised of one or a number of combinations of sensors including a radar 22, a lidar 24, and a vision system 26. Vision system 26 may be comprised of one or more cameras, CCD, or CMOS-type devices. As illustrated, a first camera 28 and a second camera 30 may form vision system 26. Both radar 22 and lidar 24 are capable of sensing the presence and the distance of an object from the vehicle and may be capable of detecting the object size. The camera system is also capable of detecting the object and the distance of an object from the vehicle. Alternatively, radar 22 or lidar 24 may be used to detect an object within a detection zone and vision system 26 may be used to confirm the presence of the object within the detection zone. The vision system consisting of camera 1 and camera 2 alone may use established triangulation technique and other vision based techniques to determine the presence of an object, the object"s distance from the vehicle, and the relative velocity of the object with respect to the host vehicle, as well as the size of the object. The object"s size may include information regarding the object area, volume, height, width, or combinations thereof. Preferably, the cameras are high-speed cameras operating in excess of 50 Hz. A suitable example is a CMOS-based high dynamic range camera capable of operating under widely differing lighting and contrast conditions.

A receiver 31 may also be included within the object sensor. Receiver 31 may, however, be a stand-alone device. Receiver 31 is also coupled to controller 12. Receiver 31 is used to receive signals from other vehicles or vehicle transponders.

A vehicle dynamics detector 32 may also be coupled to controller 12. The vehicle dynamics detector 32 generates a signal or signals indicative of the dynamic conditions of the vehicle. The vehicle dynamics detector 32 may comprise various numbers or combinations of sensors but preferably includes a speed sensor 34, a yaw rate sensor 36 and a steering wheel angle sensor 38. In addition, longitudinal acceleration sensor 40 may also be included in the vehicle dynamics detector 32. The longitudinal acceleration sensor can provide controller 12 some indication as to the occupant driving characteristics such as braking or deceleration.

Speed sensor 34 may be one of a variety of speed sensors known to those skilled in the art. For example, a suitable speed sensor may include a sensor at every wheel that is averaged by controller 12. The controller 12 can control the wheel speeds to control the speed of the vehicle. Suitable types of speed sensors 34 may include for example, two-wheel sensors such as those employed on anti-lock brake systems.

Yaw rate sensor 36 preferably provides the yaw rate of the vehicle about the center of gravity of the vehicle. The yaw rate measures the rotational tendency of the vehicle about an axis normal to the surface of the road. Although the yaw rate sensor 36 is preferably located at the center of gravity, those skilled in the art will recognize that the yaw rate sensor may be located in various locations of the vehicle and translated back to the center of gravity either through calculations at the yaw rate sensor or through calculations within controller 12 in a known manner.

Steering wheel angle sensor 38 provides a steering wheel angle signal to controller 12. The steering wheel angle signal corresponds to the steering wheel angle of the hand wheel of the automotive vehicle. The yaw rate sensor 36 and the vehicle speed sensor 34 or the steering wheel angle sensor 38 alone, or the above sensors in combination, may be used to indicate the kinematics of the vehicle as is known in the art.

Longitudinal acceleration sensor 40 may be a separate sensor or may be derived. That is, the change in speed over a predetermined time is defined as the acceleration. Thus, by measuring speed from speed sensor 34 and time from timer 16, an approximation of acceleration or deceleration may be obtained. In vehicles with systems such as yaw control or rollover control, such a sensor may already be incorporated into the vehicle.

An impact sensor 49 may comprise one or more accelerometers located at various positions throughout the vehicle to confirm impact with an object such as known in the art for deploying vehicle occupant airbag systems.

A global positioning system (GPS) 46 may also be coupled to controller 12. GPS 46 generates a vehicle position of the host vehicle in response to satellites. Controller 12 may use this information determining the relative position of the host vehicle and a target vehicle.

A transponder 42 may also be coupled to controller 12. Transponder 42 may generate information from controller 12 and transmit it to other vehicles upon the reception of a pre-determined frequency signal from another vehicle. Also, transponder 42 may always be activated and broadcasting vehicle information to other vehicles. Transponder 42 and receiver 31 may be located in a common location and may be integrally formed.

A braking system sensor 44 may also be coupled to controller 12. Braking system sensor 44 may be a sensor or sensors such as a brake pedal position sensor or a brake pressure monitor. The brake system conditions may be used to determine occupant-driving characteristics and thus provide an improved collision prediction and, as a result, provide an improved countermeasure deployment decision.

Controller 12 is used to control the activation of a countermeasure system 48. Each countermeasure may have an individual actuator associated therewith. In that case, controller 12 may direct the individual countermeasure actuator to activate the particular countermeasure. Various types of countermeasure systems are evident to those skilled in the art. Examples of a countermeasure within the countermeasure system include occupant seatbelt pretensioners, bumper height changing including nose-dipping, braking, the pre-arming of internal airbags, the deployment of exterior or internal airbags, pedal control, steering column positioning, head restraint and knee bolster control. Preferably, controller 12 is programmed to activate the appropriate countermeasure in response to the inputs from the various sensors.

To the extent that some countermeasure systems, when activated, are likely to significantly change the vehicle crash dynamics, the present invention is directed toward optimizing the performance of those countermeasures acting directly upon the vehicle occupants. In the following description, the vehicle bumper-bag system provides an example of a countermeasure which influences the vehicle crash dynamics and the occupant airbag system as an example of a countermeasure adaptively controlled in response to deployment of the vehicle bumper-bag system.

Figure 4:
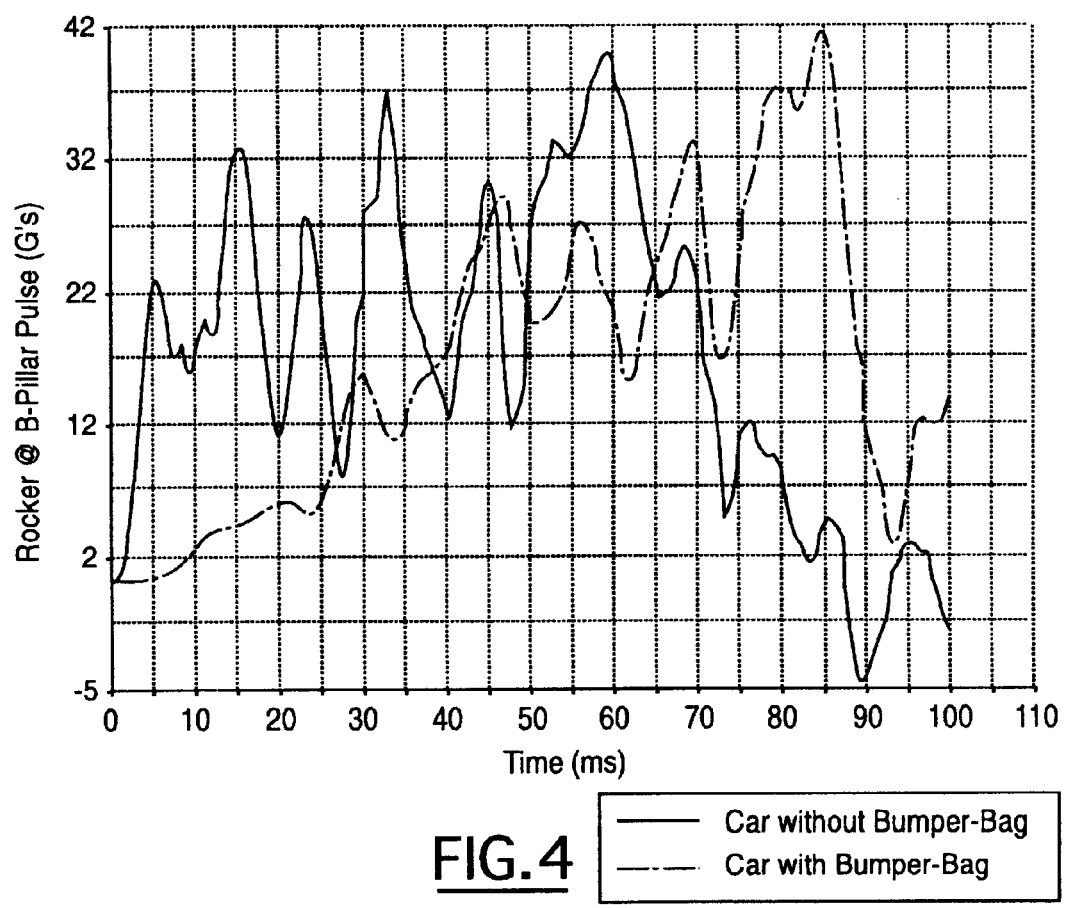
FIG. 4 is a graph of a rigid barrier crash pulse for a vehicle with and without deployment of the bumper-bag system.

The influence on vehicle crash dynamics can be seen, for example, in FIG. 4 which is a graph of a 56 km/h rigid barrier crash pulse for a vehicle with and without deployment of the bumper-bag system. As can be seen in FIG. 4, the deployment of the bumper-bag system minimizes the magnitude of the crash pulse for a 56 Km/h rigid wall frontal impact. The deceleration pulse profile for the crash simulation with bumper-bags deployed is significantly different than the deceleration pulse profile without the bumper-bags deployed. Comparing the two profiles of FIG. 4, it can be seen that it would be beneficial to coordinate, in particular, the deployment scheme of the interior occupant airbag system with the appropriate vehicle crash pulse profile in the crash situation where the bumper-bag system is deployed as well as in the crash situation when the bumper-bag system is not deployed.

Figure 5:
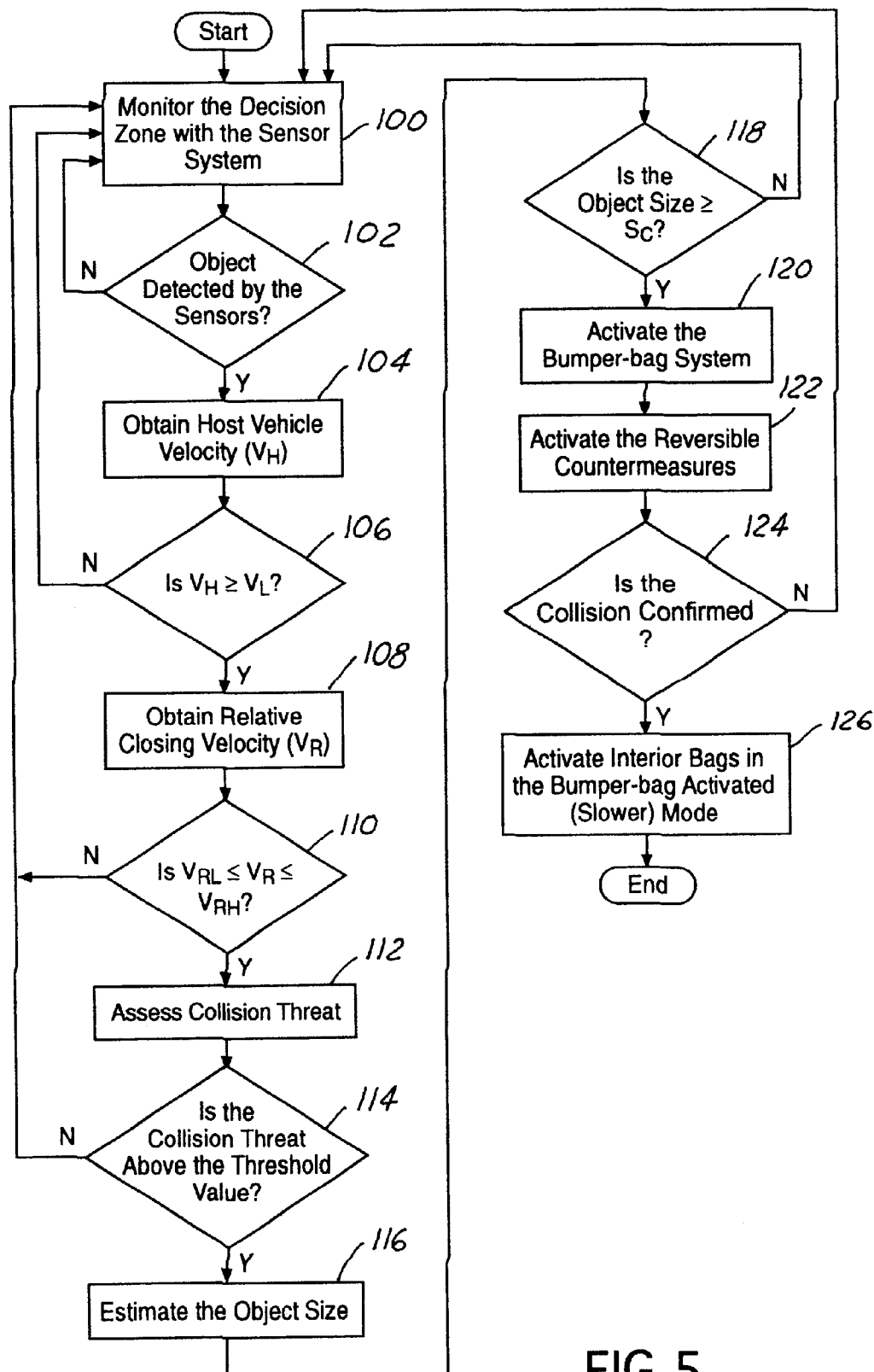
FIG. 5 is a logic flow diagram for an adaptive safety system for a bumper-bag equipped vehicle according to one embodiment of the present invention.

FIG. 5 is a logic flow diagram for an adaptive safety system for a bumper-bag equipped vehicle according to one embodiment of the present invention. Again, the adaptive safety system is described with respect to a bumper-bag deployment and the resulting modification of the interior occupant airbag deployment as a result thereof. In the broadest sense, however, the present method determines whether a vehicle safety system will be deployed which may affect the vehicle crash dynamics and, in response, modifies the activation characteristics of other vehicle safety systems to be optimized for the anticipated vehicle impact profile.

In example of FIG. 5, the logic begins in step 100 wherein the pre-crash sensing system monitors the sensor field-of-view for potential objects. If an object is detected by the pre-crash sensing system in step 102, then the host vehicle velocity ($V_H$) is determined in step 104.

The host vehicle velocity is used in deciding whether to deploy the bumper-bags. In certain situations, it may not-be desirable to activate the vehicle bumper-bag system. For example, to minimize repair costs, the bumper-bags may not be deployed for low relative velocity impacts where they may provide little or no additional; occupant safety improvements yet significantly increase the cost to repair the vehicle. Low-relative velocities may be, for example, velocities up to 22 Km/h. Additionally, due to real-time performance limitations of pre-crash sensing systems, under certain conditions such as collisions with very high relative velocities or when the sensing system cannot "see" the impacting object, such as during a high speed side collision, the bumper-bags may not be commanded to deploy or may not have time to deploy. Such high-relative velocities may be, for example, velocities above 72 Km/h. To this end, step 106 determines whether the host vehicle velocity is above a lower threshold velocity ($V_L$) such that the bumper-bag system may be deployed, if desirable. In a similar manner, the relative velocity ($V_R$) between the host vehicle and the detected object is determined, and this value is compared to the a lower relative velocity limit ($V_{RL}$) and an upper relative velocity limit ($V_{RH}$) in step 110. Assigning an upper relative velocity limit helps in improving the reliability of the bumper-bag system by eliminating unintentional deployments in some situations. If the host vehicle velocity is above the lower threshold limit and the relative velocity between the host vehicle and the detected object is within the range appropriate for bumper-bag deployment, the logic continues to step 112 wherein the collision threat between the host vehicle and the detected object is assessed.

The collision threat assessment in step 112 can be performed by any known pre-collision threat assessment schemes including a multi-sensor pre-crash sensing scheme such as shown in FIGS. 2 and 3.

If a collision is highly likely, as determined by the collision threat assessor in step 114, the detected object size is determined with, for example, the vision system or radar system in step 116. If the object size is below a threshold value ($S_C$) as is determined in step 118, it may not be desirable to activate the vehicle bumper-bag system. For example, if the detected object is very low to the ground or otherwise relatively small or very narrow, such as a pole, the bumper-bag system may be ineffective at improving the vehicle crash-worthiness. Otherwise, in step 120, the vehicle bumper-bag system is activated if the detected object is above the threshold value ($S_C$) as determined in step 118.

At this time, in step 122, other vehicle safety countermeasures may be activated such as those which are reversible. Reversible safety system countermeasures may include occupant safety seatbelt motorized pretensioning systems, bumper height adjustments including nose-dipping, vehicle braking, the pre-arming of internal occupant airbags, activate steering column positioning, active head restraint positioning and active knee bolster control. In that way, if the collision is not confirmed, for example, by vehicle impact sensors or accelerometers in step 124, the reversible countermeasures can be returned to normal operating mode. If, however, the collision event is confirmed in step 124, the activation characteristics of certain countermeasures are modified to correspond to the altered collision dynamics mode. In this case, in step 126, the interior occupant airbags are deployed in accordance with a bumper-bag activated mode. This may correspond to a delayed deployment in view of the additional energy-absorbing component and collapsible frontal length provided by the deployed bumper-bags. Besides delaying the activation of the interior airbags, the rate of airbag inflation and vent rate of the airbag may also be modified to optimize the interior airbag performance for the vehicle collision dynamics corresponding to the bumper-bag deployment crash situation. If, however, the crash event is confirmed and the bumper-bag system has not been deployed, then the interior airbags would be activated in the normal manner. This would correspond to activating the interior airbag in the same manner as if the vehicle did not have a bumper-bag system.

Figure 6:
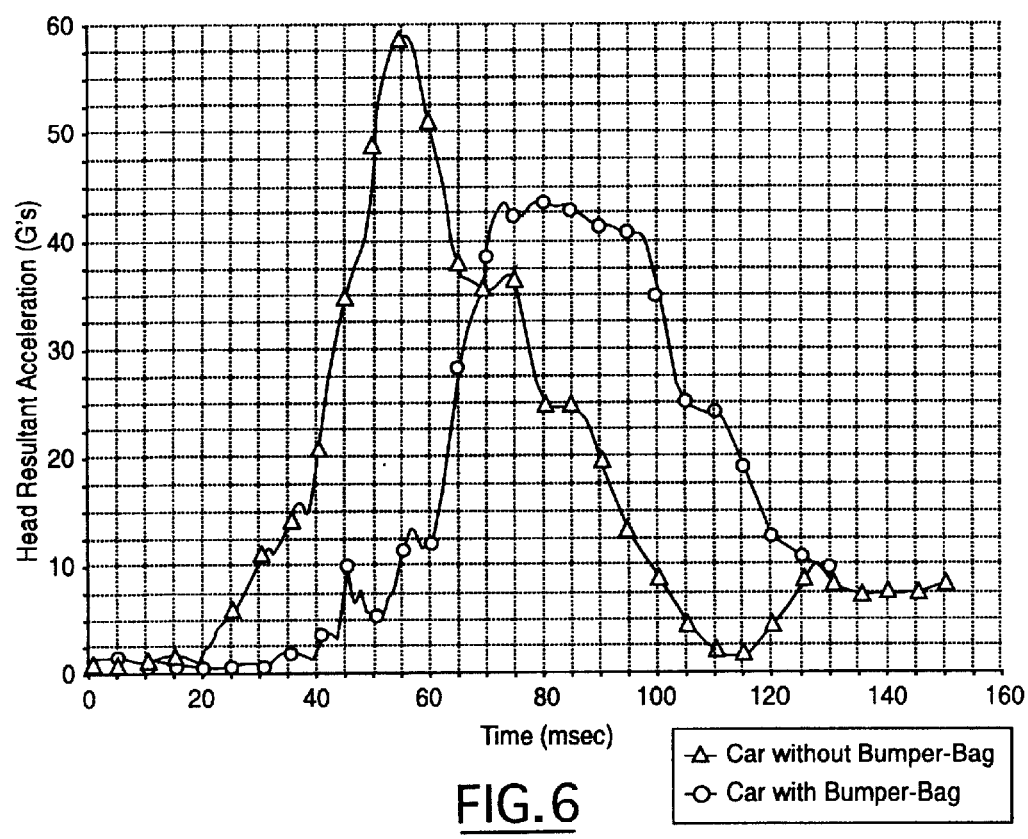
FIG. 6 is a graph of simulated head acceleration for a vehicle crash at 56 km/h with and without deployment of the bumper-bag system.

The influence of operating the interior airbags as a function of the status of the bumper-bag system activation can be seen in FIG. 6. FIG. 6 shows a graph of simulated resultant head accelerations for an occupant in a vehicle with and without bumper-bag deployment in a 56 Km/h rigid wall frontal impact. The head acceleration of FIG. 6 is for an unbelted vehicle driver. As can be seen, in the impact situation without the bumper-bag deployment, the occupant head acceleration reaches approximately 58 Gs at approximately 55 ms after impact. In this situation, the interior airbags would be deployed in the conventional manner optimized for normal impact conditions. In the case where the bumper-bag is deployed, however, the interior airbags would be optimized for a more gradually increasing and delayed deceleration profile (see FIG. 4). The trace of FIG. 6 corresponding to the bumper-bag being deployed prior to or during impact shows how the interior airbag performance can be improved to better correspond with the vehicle crash dynamics corresponding to the bumper-bag being deployed. In this example, for the same impact, the resultant head acceleration was lowered to approximately 43 Gs and delayed until approximately 80 ms after impact. Similar improved safety performance can be expected for driver chest accelerations with and without bumper-bag deployment.

From the foregoing, it can be seen that there has been brought to the art a new and improved adaptive safety system for bumper-bag equipped vehicles which has advantages over prior vehicle safety systems. In this regard, the present invention provides countermeasure deployment for one crash scenario wherein the bumper-bags are not deployed and the vehicle crash dynamics are the same as in vehicles without bumper-bags, and a modified countermeasure deployment scheme for a second crash scenario wherein the vehicle bumper-bags are properly deployed and resultingly change the vehicle crash dynamics. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. A safety system control method for a host automotive vehicle comprising:
providing a first vehicle safety countermeasure;
providing a second vehicle safety countermeasure operable in a first mode corresponding to said first vehicle safety countermeasure being inactive and a second mode corresponding to said first vehicle safety countermeasure being activated;

determining a collision threat with a target object;

selectively activating said first vehicle safety countermeasure as a function of said collision threat; and activating said second vehicle safety countermeasure in said second mode when said first vehicle safety countermeasure is activated.

2. A method according to claim 1 further comprising detecting a crash event and, in response, activating said second vehicle safety countermeasure in said first mode when said first vehicle safety countermeasure is inactive.

3. A method according to claim 1 wherein said first vehicle safety countermeasure comprises an external vehicle airbag.

4. A method according to claim 3 wherein said external vehicle airbag comprises a front or rear bumper airbag.

5. A method according to claim 1 wherein said second vehicle safety countermeasure comprises an internal vehicle occupant airbag.

6. A method according to claim 3 wherein said second vehicle safety countermeasure comprises an internal vehicle occupant airbag.

7. A method according to claim 5 wherein said second mode of the second vehicle safety countermeasure has a modified response as compared to said first mode.

8. A method according to claim 1 comprising determining a host vehicle velocity, and activating said first vehicle countermeasure when said host vehicle velocity exceeds a threshold velocity value and when said collision threat exceeds a threshold collision value.

9. A method according to claim 1 comprising determining a relative velocity between said host vehicle and said detected object, and activating said first vehicle countermeasure when said relative velocity is within a range of threshold relative velocity values and when said collision threat exceeds a threshold collision value.

10. A method according to claim 8 comprising determining a relative velocity between said host vehicle and said detected object, and activating said first vehicle countermeasure when said relative velocity is within a range of threshold relative velocity values and when said collision threat exceeds a threshold collision value.

11. A method according to claim 1 comprising determining a size of said target object, and selectively activating said first vehicle safety countermeasure as a function of said target object size.

12. A method according to claim 8 comprising determining a size of said target object, and selectively activating said first vehicle safety countermeasure as a function of said target object size.

13. A method according to claim 9 comprising determining a size of said target object, and selectively activating said first vehicle safety countermeasure as a function of said target object size.

14. A method according to claim 10 comprising determining a size of said target object, and selectively activating said first vehicle safety countermeasure as a function of said target object size.

15. A safety system control method for a host automotive vehicle including at least one external vehicle airbag and at least one internal occupant airbag, the method comprising:

determining a collision threat with a target object;

selectively activating said at least one external vehicle airbag as a function of said collision threat; and in response to a crash event, activating said at least one internal occupant airbag in a first mode when said at least one external vehicle airbag is activated, otherwise, activating said at least one internal occupant airbag in a second mode when said at least one external vehicle airbag is inactive.

16. A method according to claim 15 wherein said at least one external vehicle airbag comprises a front or rear bumper airbag.

17. A method according to claim 15 comprising determining a host vehicle velocity, and activating said at least one external vehicle airbag when said host vehicle velocity exceeds a threshold velocity value and when said collision threat exceeds a threshold collision value.

18. A method according to claim 17 comprising determining a relative velocity between said host vehicle and said detected object, and activating said at least one external vehicle airbag when said relative velocity is within a range of threshold relative velocity values.

19. A method according to claim 18 comprising determining a size of said target object, and selectively activating said at least one external vehicle airbag as a function of said target object size.

20. A safety system for an automotive vehicle having a pre-crash sensing system and a countermeasure system comprising:

a first vehicle safety countermeasure;

a second vehicle safety countermeasure operable in a first mode corresponding to said first vehicle safety countermeasure being inactive and a second mode corresponding to said first vehicle safety countermeasure being activated; and a controller coupled to said pre-crash sensing system and said first and second vehicle safety countermeasures, said controller determining a collision threat with a target object, selectively activating said first vehicle safety countermeasure as a function of said collision threat, and activating said second vehicle safety countermeasure in said second mode when said first vehicle safety countermeasure is activated.

* * * * *